United States Patent [19]
Kashyap et al.

[11] Patent Number: 6,041,069
[45] Date of Patent: Mar. 21, 2000

[54] LASER DEVICE TUNED BY FORMING A REFRACTIVE INDEX GRATING IN OPTICAL FIBER

[75] Inventors: Raman Kashyap; Jonathan Richard Armitage, both of Ipswich, United Kingdom

[73] Assignee: British Telecommunications public limited company, London, United Kingdom

[21] Appl. No.: 08/877,997

[22] Filed: Jun. 18, 1997

Related U.S. Application Data

[63] Continuation of application No. 08/609,485, Mar. 1, 1996, abandoned, which is a continuation of application No. 08/263,749, Jun. 22, 1994, abandoned, which is a division of application No. 07/940,960, Nov. 3, 1992, Pat. No. 5,377,288.

[30] Foreign Application Priority Data

Apr. 6, 1990 [GB] United Kingdom .................. 9007912

[51] Int. Cl.⁷ ........................................................ H01S 3/30
[52] U.S. Cl. ................... 372/6; 372/20; 372/102; 385/37
[58] Field of Search .................. 372/20, 6, 39, 372/102, 96; 385/37

[56] References Cited

U.S. PATENT DOCUMENTS

| | | |
|---|---|---|
| 3,809,455 | 5/1974 | Pekau et al. . |
| 4,622,114 | 11/1986 | Glass et al. . |
| 4,955,025 | 9/1990 | Mears et al. ................................. 372/6 |
| 5,005,175 | 4/1991 | Desurvire et al. ........................... 372/6 |
| 5,134,620 | 7/1992 | Huber ........................................... 372/6 |
| 5,200,964 | 4/1993 | Huber ..................................... 372/6 X |
| 5,218,655 | 6/1993 | Mizrahi ................................. 385/37 X |
| 5,243,609 | 9/1993 | Huber ..................................... 372/6 X |
| 5,260,823 | 11/1993 | Payne et al. ........................... 372/6 X |
| 5,305,335 | 4/1994 | Ball et al. .................................... 372/6 |
| 5,317,576 | 5/1994 | Leonberger et al. ........................ 372/6 |

FOREIGN PATENT DOCUMENTS 2-43783  2/1990  Japan ......................................... 372/6

OTHER PUBLICATIONS

Jauncey et al, "Narrow–linewidth fiber laser operating at 1.55 um", Optics Letters, vol. 12, No. 3, pp. 164–165, Mar. 1987.
R. Wyatt, "High–power broadly tunable erbium–doped silica fibre laser", Electronics Letters, vol. 25, No. 22, pp. 1498–1499, Oct. 1989.
Optical Fiber Communications—Principles and Practice, Senior, Second Edition, 1992, pp. 360–362 & 373.
Applied Optics, vol. 24, No. 19, Oct. 1985, Moshrefzadeh et al: "Simple Versatile Method for Fabricating Guided–Wave Gratings", pp. 3155–3161.
Hill et al, "Photosensitivity in Optical Fiber Waveguides: Application to Reflection Filter Fabrication", Appl. Phys. Lett. 32(10), May 15, 1978, 1978 American Institute of Physics, pp. 647–649.
Stone, "Photorefractivity in $GeO_2$–doped Silica Fibers", J. Appln. Phys. 62(11), Dec. 1, 1987, 1987 American Institute of Physics, pp. 4371–4374.
Kashyap, "Photo–Induced Enhancement of Second Harmonic Generation", British Telecom Research Laboratories, Martlesham Heath, Ipswich IP4 7RE, UK, pp. 255–258.

(List continued on next page.)

Primary Examiner—Hemang Sanghavi
Attorney, Agent, or Firm—Nixon & Vanderhye P.C.

[57] ABSTRACT

A resonant laser device including first and second reflectors defining an optical cavity with given optical resonance characteristics. The laser device including a laser active material in a first optical fiber disposed between the reflectors in the cavity and a second photosensitive optical fiber coupled to the cavity. One of the reflector being a refractive index grating formed in the second fiber such that the laser operates with a selected predetermined wavelength and the laser being tuned to a different wavelength by exposing the second fiber to a second spatially periodic pattern of optical radiation such that the second pattern becomes recorded in the second optical fiber.

10 Claims, 5 Drawing Sheets

OTHER PUBLICATIONS

Lam et al, "Characterization of Single–Mode Optical Fiber Filters", Applied Optics/vol. 20, No. 3, Feb. 1, 1981, pp. 440–445.

Meltz et al, "Formation of Bragg Gratings in Optical Fibers by a Transverse Holographic Method", 1989 Optical Society of America, pp. 823–825.

"Intermodal Coupler Using Permanently Photoinduced Grating in Two–Mode Optical Fibre", Electronics Letters, Jun. 8, 1989, vol. 25, No. 12, pp. 797–798.

"Phase–Matching of Optical Fibre Photorefractive Intermodal Couplers in Infrared", Electronics Letters, Nov. 9, 1989, vol. 25, pp. 1590–1591.

"Optical Fiber Communication Conference", 1990 Technical Digest Series, vol. 1, Postconference Edition.

Hand et al, "Single–Mode Fibre Grating Written Into Sagnac Loop Using Photosensitive Fibre: Transmittion Filters", Optical Fibre Group, Depart. of Electronics and Computer Science, pp. 64–65.

Chandra et al., "Prism–dye Laser", Appln. Phys. Lett., vol. 21, No. 4, Aug. 15, 1972, pp. 144–146.

Lucek et al, "Second–Harmonic Generation in Glass Fibres", Journal of Modern Optics, 1990, vol. 37, No. 4, pp. 533–543.

Sorin et al., "A Single–Mode Fiber Evanescent Grating Reflector", Journal of Lightwave Technology, vol. LT–3, No. 5, Oct. 1985, pp. 1041–1043.

Hand et al, "Photoinduced Refractive–Index Changes in Germanosilicate", Optics Letters, vol. 15, No. 2, Jan. 15, 1990, pp. 102–104.

LASER DEVICE TUNED BY FORMING A REFRACTIVE INDEX GRATING IN OPTICAL FIBER

This is a continuation of application Ser. No. 08/609,485, filed Mar. 1, 1996, now abandoned, which was a continuation of application Ser. No. 08/263,749, filed Jun. 22, 1994, now abandoned, which was in turn a divisional of application Ser. No. 07/940,960, filed Nov. 3, 1992, now U.S. Pat. No. 5,377,288, issued Dec. 27, 1994.

BACKGROUND OF THE INVENTION

1. Field of the Invention

This invention relates to methods of forming refractive index gratings in optical waveguides of particular, but not exclusive, application to forming such gratings in optical fibre waveguides.

2. Related Art

Optical waveguide gratings have many applications, for example as passive wavelength filters in wavelength multiplexed telecommunications and sensor systems and as frequency selective elements in active fibre devices.

One approach to making an optical waveguide grating is to form an external grating interacting with the evanescent field of the waveguide, for example by etching a grating close to the nearly exposed core of an optical fibre. A second approach, with which the present application is concerned, is to form a refractive index grating within the core of the waveguide. A standing wave is set up using two interfering beams derived from a single-frequency laser which, if sufficiently intense, writes a refractive index grating into the waveguide core over a time period in the order of minutes.

WO86/01303 published on the Feb. 27, 1986 describes a method of forming such a crating in an optical fibre waveguide by illuminating it transversely with a standing wave interference pattern set up by two suitable angled ultraviolet beams derived from a single coherent source. The two ultraviolet beams are produced by directing the source TV beam onto a beamsplitter which produces a pair of subsidiary beams which are reflected by a pair of mirrors to form a standing interference pattern in the region of the optical fibre. The grating spacing is controllable by varying the angle of incidence of the interfering subsidiary beams.

The writing wavelength is chosen to be one which efficiently modifies the refractive index of the medium. The grating so formed will be effective at longer wavelengths at which it may not be possible to write a grating.

This prior art apparatus for forming such gratings has several optical elements which must be maintained accurately in position relative to the UV source and optical fibre for the several minutes of exposure time needed to form the grating. This may be adequate when production of the gratings is made in carefully prepared and controlled surroundings. However, the applicant has identified a need for such gratings that necessitate the formation of gratings in less controlled surroundings.

BRIEF SUMMARY OF THE INVENTION

According to the present invention a method of forming a refractive index grating in an optical waveguide comprises positioning the optical waveguide against a first face of a block of refractive material and directing a coherent beam of optical radiation at a first wavelength at the block so that a standing wave field is formed within the optical waveguide by a first portion of the beam propagating through the block directly to the first face and a second portion reflected at a second face of the block, which field is maintained until a refractive index grating reflective at a second wavelength longer than the first is formed.

Gratings reflective in the regions of 1.3 $\mu$m and 1.5 $\mu$m have particular application to current silica based optical communication system employing silica telecommunication fibres. It is also applicable to other wavelengths for example the formation of gratings operative in the 2.7 $\mu$m window of fluoride fibres written with visible light, for example.

The block is conveniently a right triangular or rectangular prism which are readily available.

The position of the fibre relative to the prism can be maintained by simply fixing the fibre to the prism face leaving only the source of optical radiation to be fixed relative to the prism. The alignment problems associated with the prior art sidewriting technique are thereby greatly reduced.

The optical waveguide may be an optical fibre or a planar waveguide such as germania doped planar waveguides formed by flame hydrolysis deposition.

The second face of the block may reflect the beam by total internal reflection, or if this is not possible with the particular wavelengths and block geometries used in a given application, by forming a reflective film on the second face.

The present invention also offers versatility in the type of grating that can be written within an optical waveguide. The face of the block or prism producing one of the interfering beams by internal reflection may be curved to produce a chirped grating, for example. More generally, the coherent beam of radiation may be passed through a phase plate, for example a computer generated phase plate, before entering the prism which will determine the interference pattern within the waveguide and hence the type of grating. This permits the formation of generally amplitude and frequency modulated refractive index gratings for example. The phase plate may be formed on a face of the prism or block to keep the number of separated optical components to a minimum.

Other grating structures may be obtainable by use of masks on the various prism faces or by using a faceted second face. Other means of varying the gratings structure may be readily devised for use with the method of the present invention.

The method of the present invention allows fine tuning of the grating spacing to be made during its formation. The refractive index grating can be monitored during formation to determine the wavelength at which it starts to reflect. If this is not the desired preselected wavelength, the angle of incidence of the UV beam at the first face of the prism can be altered to adjust the grating spacing. Once the reflected wavelength at the start of the grating formation is equal to the preselected wavelength the interference field is maintained without further adjustment until the grating is fully formed, i.e. when the reflectivity at that preselected wavelength is maximised.

This tunability is anticipated to have a significant impact on the production of lasers for optical communications networks employing wavelength division multiplexing (WDM). Lasers for such networks need to be accurately tuned to a wavelength channel to which the laser is dedicated. If the laser malfunctions a replacement laser tuned to the identical frequency must be obtained as a replacement. If several hundreds of wavelength channels are being used this requires an enormous stock of replacements if repair is to be achieved quickly. Similarly, if a transmitter is reallocated to another channel, a new laser set to the required new channel must be provided.

The present invention greatly simplifies the provision of new, specifically tuned lasers in that it allows a grating to be formed at the ends of an optical fibre having a core which has been doped with an optically active dopant (such as erbium ions in a silica fibre) to form a laser, the reflected frequency being monitored and adjusted, as described above, to obtain the required lasing frequency. That is, only a single type of optically active fibre need be stocked, the laser being formed by making a grating according to the method of the present invention at the required wavelength. The grating could be made in the active fibre itself or made separately in non-active fibre subsequently spliced to the active fibre.

BRIEF DESCRIPTION OF THE DRAWINGS

The method of forming infra-red reflection gratings according to the present invention will now be described with reference to the accompanying drawing in which.

DETAILED DESCRIPTION OF EXEMPLARY EMBODIMENTS

Figure 1:
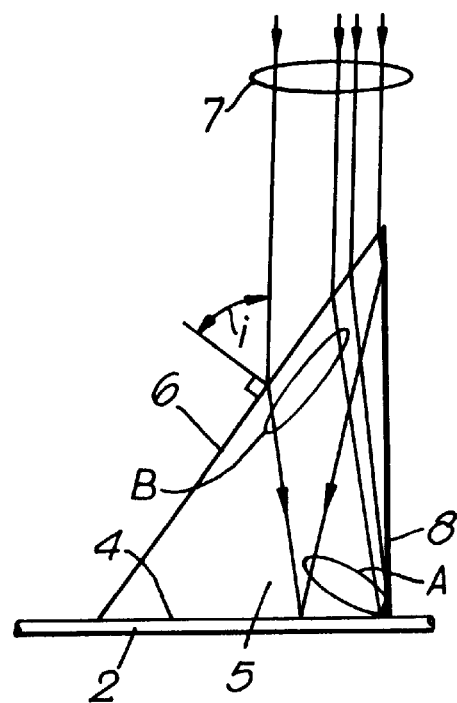
FIG. 1 is a schematic diagram of apparatus suitable for carrying out the method of the present invention.

Referring to FIG. 1, an infra-red reflection grating is formed in an optical fibre 2 (shown with exaggerated thickness or clarity) as follows. The fibre 2 is fixed to a face 4 of a triangular right prism 5 of fused silica as the writing beam is in the ultraviolet. A beam of coherent ultraviolet light 7 is directed at a second face 6 of the prism so that a portion A of the beam 7 is internally reflected at the second face to interfere at the face 4 with a portion B of the beam not so internally reflected.

The standing interference field at the face 4 has been found to be able to impress periodic refractive index variations within the core of the fibre. By choosing an appropriate angle of incidence i of the coherent beam 7 with the surface 6 an infra-red grating of the desired spacing is formed.

Figure 2:
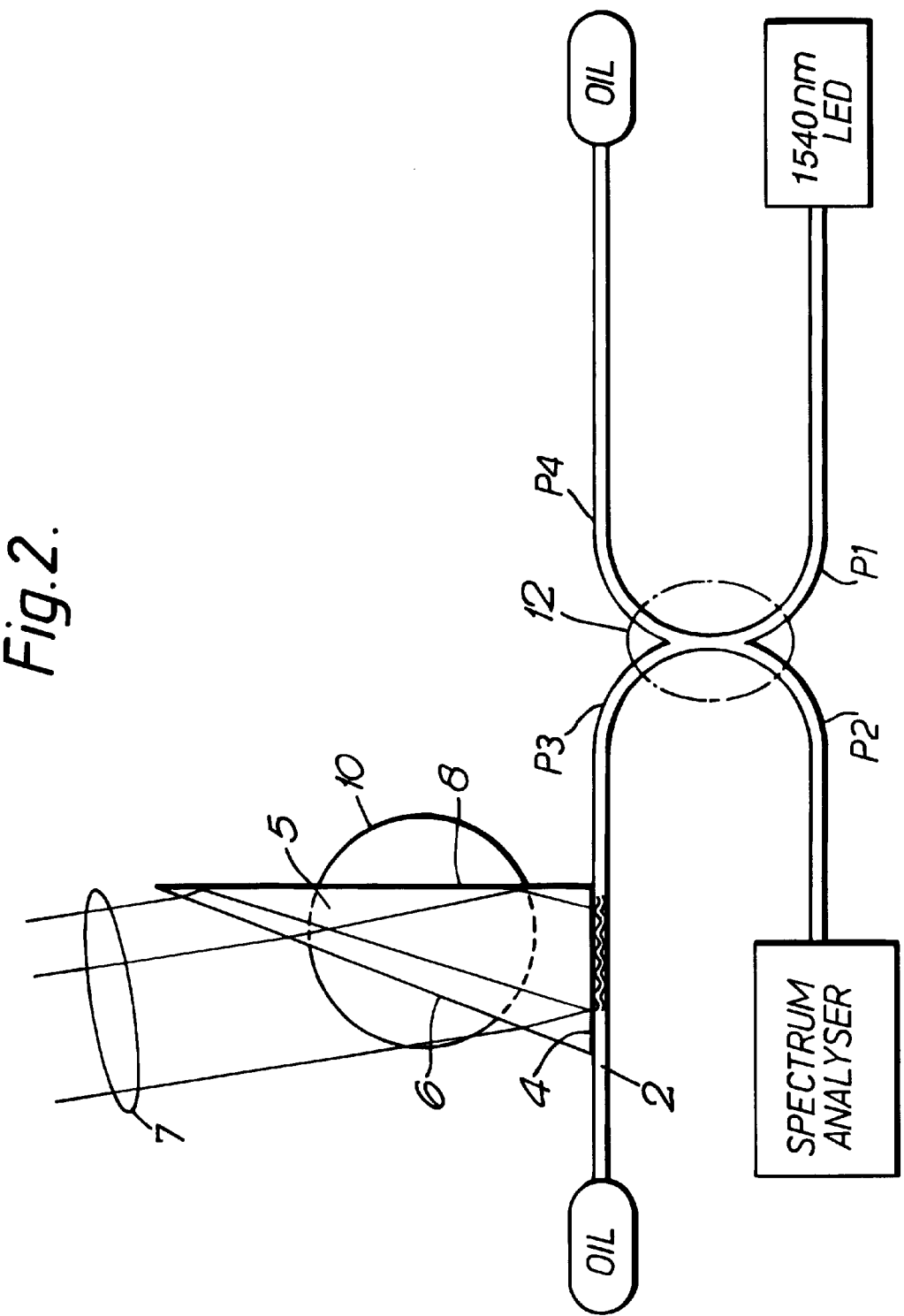
FIG. 2 is a schematic diagram of apparatus for monitoring the formation of infra-red gratings in an optical fibre.

Referring now to FIG. 2, apparatus is shown used to monitor the formation of a grating using the apparatus and method of FIG. 1. The beam 7, generated by an intra-cavity frequency-doubled $Ar^+$ laser operating at 257.3 nm and providing 100 mW of cw power, was expanded in one-dimension using a pair of fused silica prisms (not shown) and allowed to pass into the fused silica prism 5 with the beam 7 directed generally towards the right angle apex of the prism contained by the surfaces 4 and 8. The beam 7 strikes the surface 4 at an angle of approximately 90 degrees to the normal to the surface 4, part directly and part via total internal reflection at the surface 8. A length of silica fibre 2 in optical contact with the surface 4 of the prism was thus exposed to the standing wave formed by the two overlapping portions of the UV beam 7. The prism 5 was placed on a rotation stage, shown diagrammatically as 10 in FIG. 2, so allowing the angle of intersection of the two portions to be varied for fine tuning of the grating. This length of fibre 2 formed one arm, or port, P3 of a 50:50 fused fibre coupler 12 having ports P1 to P4. A pigtailed ELED, of centre wavelength of 1540 nm and with a 3 dB bandwidth of 100 nm, was spliced onto port P1 of the coupler 12. Port P2 was used to monitor the back reflected light from the grating, while port P4 was index-matched to avoid spurious back reflections. Before exposing the fibre 2 coupled to port P3 to the uv radiation, the 4°/o fresnel reflection from a cleaved fibre end of port P3 was used to calibrate the reflected signal measured by an Advantest spectrum analyser (Model No. Q8381) coupled to port P2. Port P3 was then index matched to eliminate this end-reflection before attempting to write the grating. In this way the growth of the narrow bandwidth reflection could be monitored while the grazing was being formed.

Figure 3:
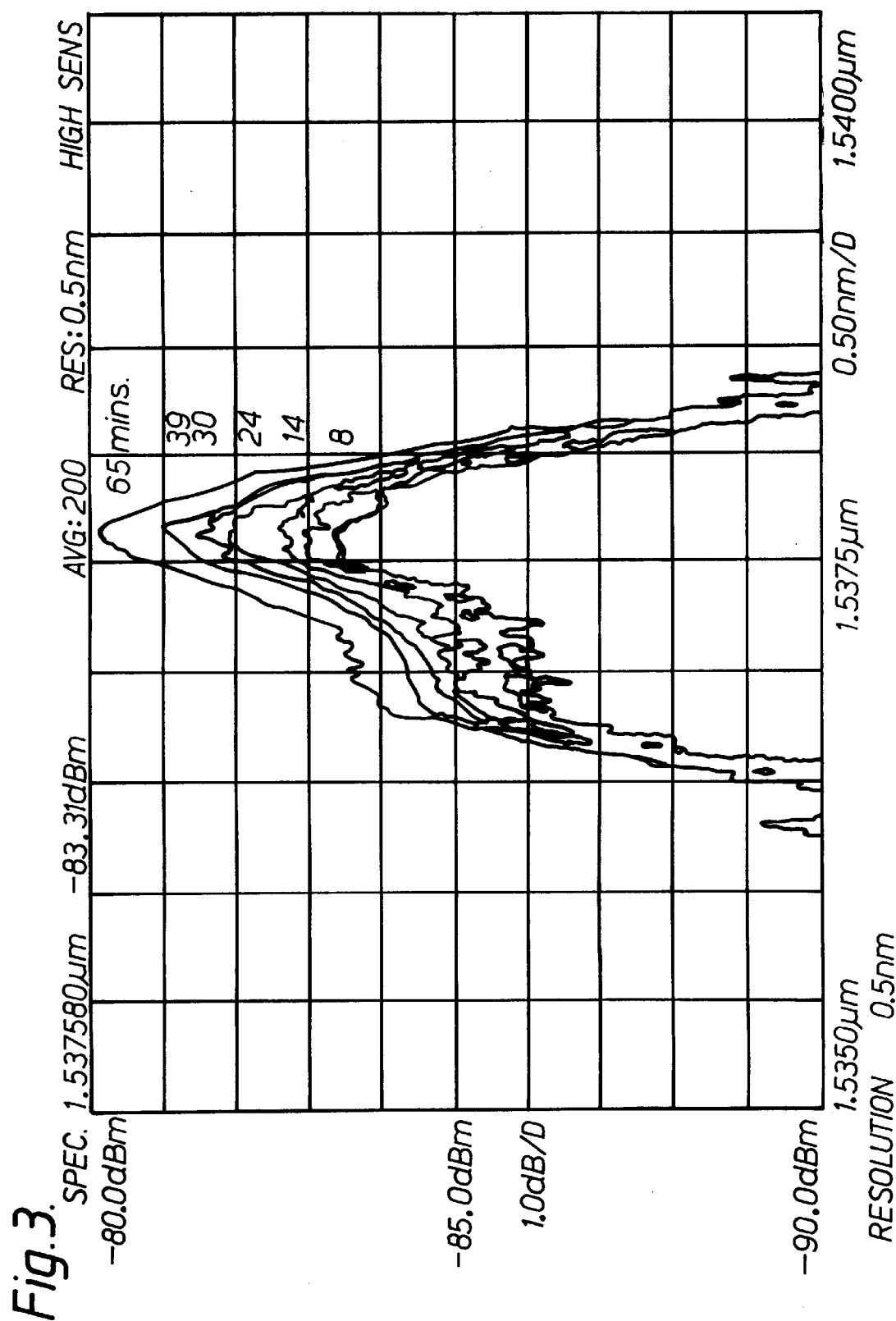
FIG. 3 is a graph showing the variation of reflected signal with time during formation of the infra-red grating.

FIG. 3 shows the reflected signal reaching port P3 at various writing times. When a reflectivity of 0.5°/o was reached, the length of fibre 2 containing the fibre grating was broken off. A small ball was fused on to one end to reduce end-reflections, and the other end fusion jointed to 30 meters of $Er^{3+}$ doped fibre. This doped fibre had a $\Delta n$ of 0.017, and $LP_{11}$ cut-off at about 1.2 $\mu m$ and an unpumped absorption of around 3 $dBm^{-1}$ at the peak of the 1.5 $\mu m$ band. A 100°/o reflector, butted up to the other end of the $Er^{3+}$ doped fibre, completed the laser cavity. When pumped with a 980 nm $TiAl_2O_3$ laser, this $Er^{3+}$ fibre laser was found to oscillate at 1537.5 nm—precisely the wavelength of the passive reflection from the fibre grating. The lasing threshold was approximately 40 mW launched power and for a launched pumped power of 600 mW an output power of 300 mW at 1537.5 nm was obtained with a measured time averaged linewidth of about 1 GHz. Even though such a very low reflectivity output coupler was used, as expected for a laser with no internal losses, essentially quantum limited performance was attained. Polarisation control of the fibre laser was found to be unnecessary.

Since photo-sensitive gratings do not require complicated materials processing, they are easier to make than those etched directly into silica fibre.

Figure 4:
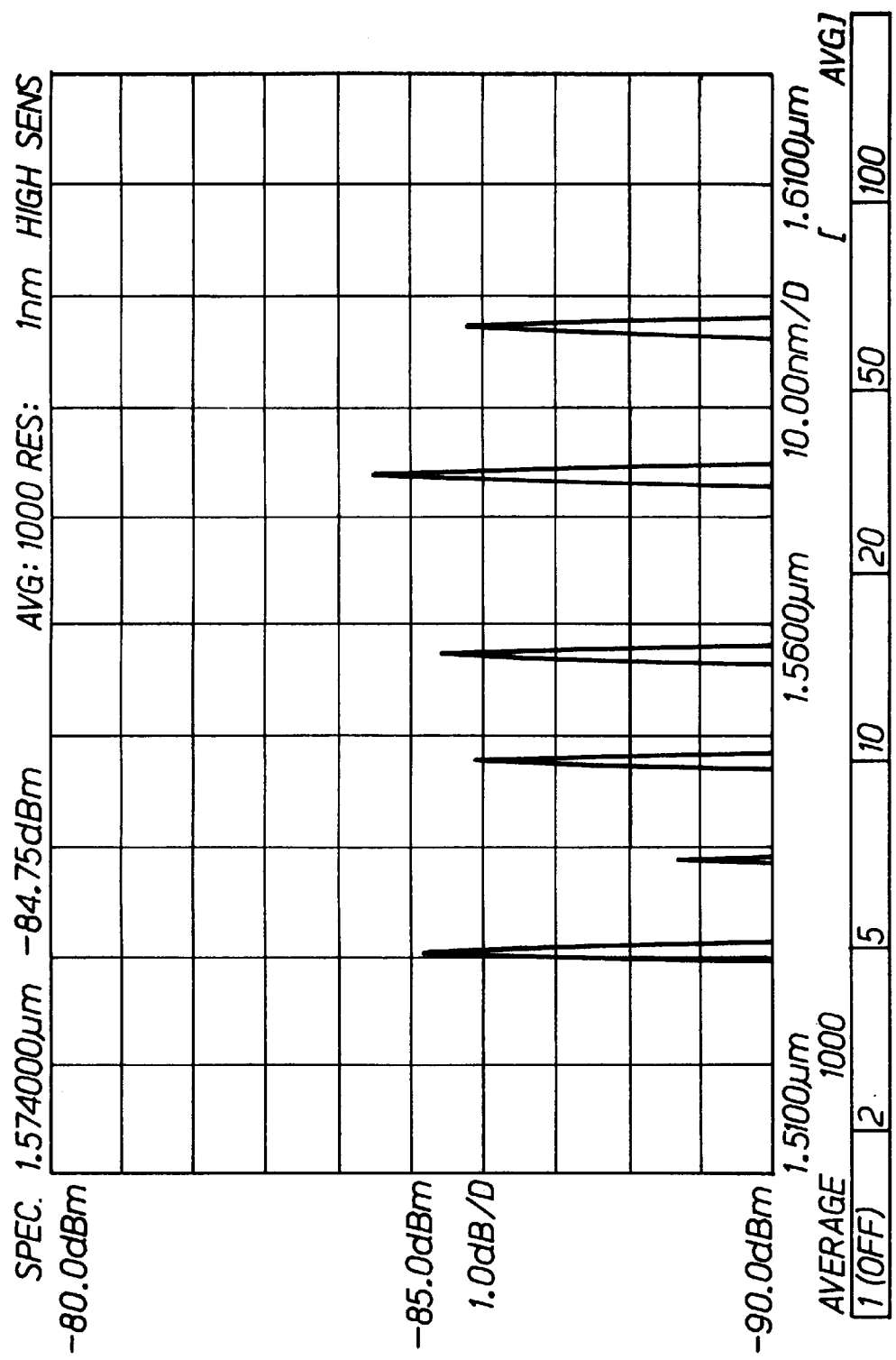
FIG. 4 is a graph showing the reflected spectrum of a fibre in which several gratings have been written.
Figure 6:
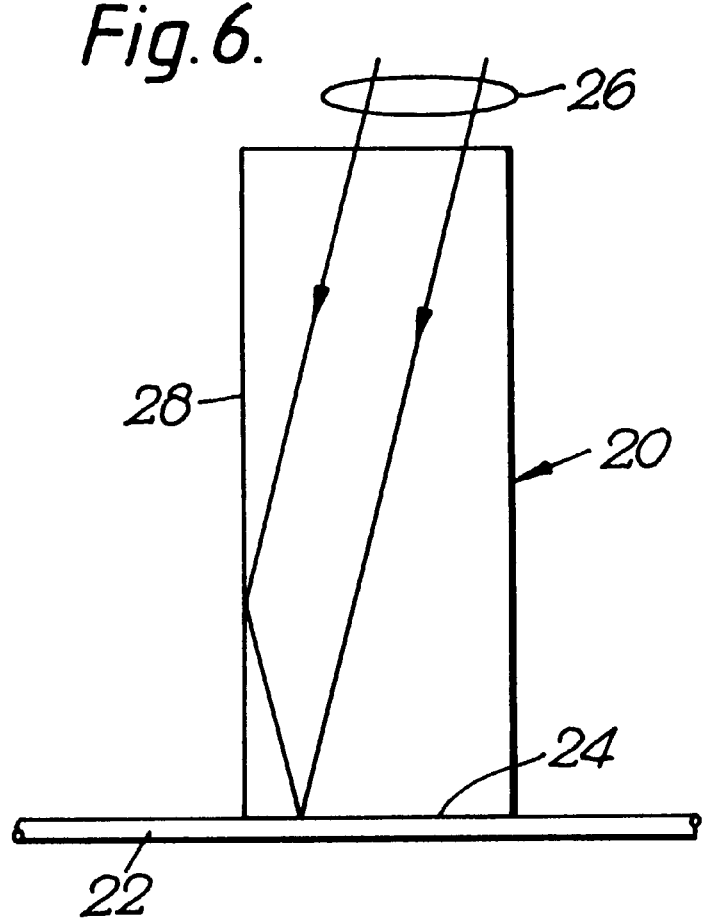
FIG. 6 is a schematic diagram of apparatus for forming infra-red gratings in an optical fibre.
Figure 7:
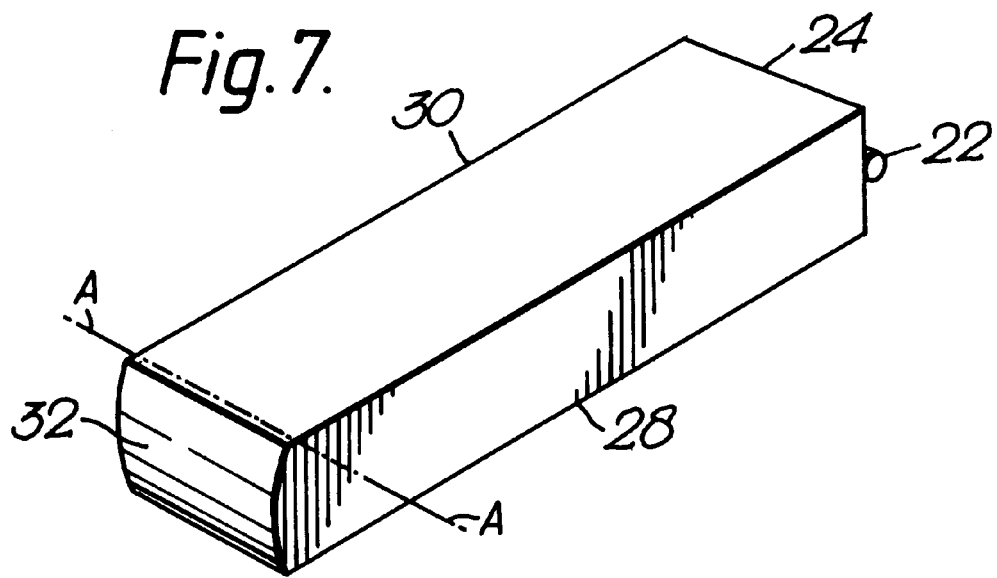
FIG. 7 is a schematic diagram of apparatus for forming infra-red gratings in an optical fibre incorporating a cylindrical lens to increase the intensity of the grating forming beam at the fibre.

Referring now to FIG. 4, there is shown the reflectivity spectrum for a fibre having several gratings written by the method of the present invention to cause reflection at various wavelengths between 1450 nm and 1600 nm, this range is being delimited by the output spectrum of the ELED, with the maximum efficiency achieved to date for a 3 mm long grating of around 6.3°/o.

The reflectivity at the Bragg wavelength for a periodic refractive index perturbation of magnitude $\Delta n$ is given by $$R = \tanh^2 \pi L m \eta / \lambda \qquad (1)$$

where L is the length of the grating, $\lambda$ is the Bragg reflection wavelength and $\eta$ is the fraction of the power in the mode power located in the fibre core. For the above described 5°/o reflector, we estimate a maximum refractive index modulation of around $4 \times 10^{-5}$ for the 3 mm long grating. Furthermore, we believe that the visibility of the interference fringes at the fibre core is not particularly high due to many reflections and phase distortions within the fibre. Although the reflection coefficient achieved so far is small, extrapolation of our results, using Eq. (1), would lead us to believe that a 20 mm long grating with a similar index chance would have a reflection coefficient of over 80°/o. If an index change of $10^{-4}$ were attained, the reflection coefficient for 20 mm long grating would be greater than 99°/o.

Figure 5:
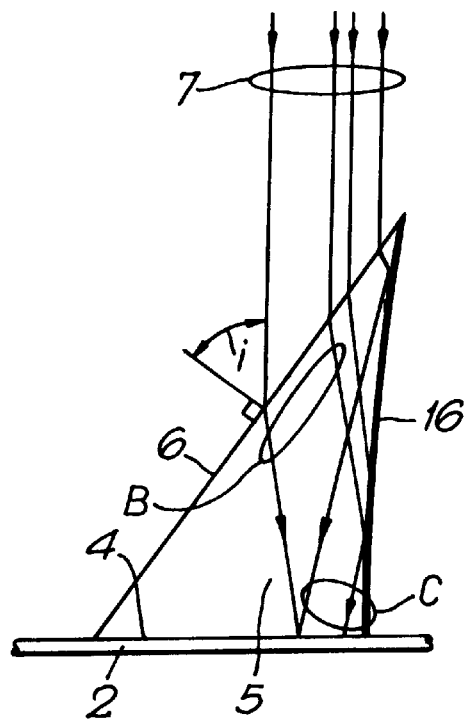
FIG. 5 is a schematic diagram of apparatus for writing a chirped grating using the method of the present invention.

A chirped grating can be made in a similar manner to the regularly spaced grating described with reference to FIG. 2 by producing the standing interference field with a prism having a curved second face 16 as shown in FIG. 5. The other elements are as shown in FIG. 1 and have the same reference numerals. In this case the beam portion reflected by the face 16 (beam C) is divergent which gives rise to the desired chirped grating.

The method of the present invention is applicable to other waveguides and to other spectral regions of writing and reflected wavelengths which are known or may be found to be susceptible to the formation of refractive index gratings.

What is claimed is:

1. A rare earth doped fibre laser including first and second fibres, the first optical fibre including a laser-active rare-earth dopant, and the second optical fibre being photosensitive to enable a refractive index grating to be recorded therein and being optically coupled to the first fiber, said second optical fibre including a reflector comprising a refractive index grating formed in its core, the grating having been formed by exposing the second fibre to a first spatially periodic pattern of optical radiation such that said first pattern becomes recorded in the core of the second fibre, the spatial periodic pattern having been configured such that the laser operates with a selected predetermined wavelength with an extremely narrow bandwidth, determined by the spatially periodic pattern, and is selectively tunable for extremely narrow bandwidth operation at a different wavelength by exposing the second fibre to a second spatially periodic pattern of optical radiation such that said second pattern becomes recorded in the core.

2. A laser as in claim 1, wherein the refractive index grating is formed in a core of germania-doped material.

3. A laser as in claim 1, wherein the first optical fibre includes a reflector, and the second optical fibre forms part of an optical cavity of the laser and separates the first optical fibre from the refractive index grating.

4. A laser as in claim 1, wherein said first and said second optical fibres are joined one to the other by a fusion splice.

5. A laser as in claim 1, wherein the second optical fibre includes a germania dopant.

6. A laser as in claim 1, wherein the rare-earth dopant is not present in said second optical fibre.

7. A laser as in claim 1, wherein the first optical fibre includes a laser active material which is a rare-earth dopant in a suitable host.

8. A laser as in claim 7, wherein the rare-earth dopant is erbium.

9. A resonant laser device for transmitting optical signals of a predetermined wavelength characteristic in an optical telecommunications network, said device comprising:

first and second reflectors defining an optical cavity with given optical resonance characteristics;

a laser active material in a first optical fiber disposed between the reflectors in the cavity;

a second photosensitive optical fiber coupled to the cavity; and at least one of the reflectors comprises a refractive index grating formed in the second optical fiber; said refractive index grating having a first cyclic spatial refractive index variation preselected during formation of the grating in the fiber so as to tune the resonance characteristics of the resonant cavity to said predetermined wavelength characteristics and said laser device being tunable for extremely narrow bandwidth operation at a different wavelength by exposing the second fiber to a second spatially periodic pattern of optical radiation such that said second pattern becomes recorded in the second optical fiber.

10. A method of making a rare earth doped, wavelength tunable fibre laser including a first optical fibre that includes a laser-active rare-earth dopant, and a second optical fibre that is coupled to the first fibre and is photosensitive to enable a refractive index grating that acts as a laser reflector to be recorded therein, the method comprising (a) exposing the second fibre to a first spatially periodic pattern of optical radiation which becomes recorded in the second fibre, the spatial periodic pattern being configured such that the laser in use operates with a selected predetermined wavelength with an extremely narrow bandwidth determined by the spatially periodic pattern, and (b) selectively tuning the laser for extremely narrow bandwidth operation at a different wavelength by exposing the second fibre to a second spatially periodic pattern of optical radiation such that said second pattern becomes recorded in the second fibre.

* * * * *